United States Patent [19]

Beach et al.

[11] Patent Number: 5,589,522
[45] Date of Patent: Dec. 31, 1996

[54] INK COMPOSITION

[75] Inventors: Bradley L. Beach, Lexington, Ky.;
James F. Feeman, Wyomissing, Pa.;
Anna M. Pearson, Richmond; Jing X. Sun, Lexington, both of Ky.

[73] Assignee: Lexmark International, Inc., Lexington, Ky.

[21] Appl. No.: 360,200

[22] Filed: Dec. 21, 1994

[51] Int. Cl.⁶ ........................................................ C03C 17/00
[52] U.S. Cl. ............................ 523/160; 523/161; 524/460; 524/555; 524/556; 524/599; 524/606; 524/608; 524/827
[58] Field of Search ........................................ 524/599, 606, 524/608, 460, 555, 556, 827; 523/160, 161

[56] References Cited

U.S. PATENT DOCUMENTS

| | | | |
|---|---|---|---|
| 4,597,794 | 7/1986 | Ohta et al. | 106/20 |
| 5,085,698 | 2/1992 | Ma et al. | 106/20 |
| 5,086,307 | 2/1992 | Noguchi et al. | 346/140 |
| 5,231,131 | 7/1993 | Chu et al. | 524/504 |
| 5,254,425 | 10/1993 | Suzuki et al. | 430/115 |
| 5,302,197 | 4/1994 | Wickramanayke et al. | 106/22 H |
| 5,310,778 | 5/1994 | Shor et al. | 524/556 |

*Primary Examiner*—Edward J. Cain
*Attorney, Agent, or Firm*—John A. Brady

[57] ABSTRACT

The invention relates to an aqueous ink composition for use in ink jet printers comprising an aqueous carrier, a pigment, and, preferably, a graft polymer having a polyacrylic acid backbone and hydrophobic side chains.

13 Claims, No Drawings

INK COMPOSITION

RELATED APPLICATION

A patent application entitled "Ink Composition", U.S. Ser. No. 08/360,199, filed Dec. 21, 1994, the same day as this application, and having some common inventors with this application is to siloxyl embodiments of this invention. A joint assignee of that application is the sole assignee of this application.

TECHNICAL FIELD

The present invention relates to ink compositions for ink jet printers.

BACKGROUND OF THE INVENTION

Ink jet printing is accomplished by ejecting ink from a nozzle toward paper or another print medium. The ink is driven from the nozzles toward the medium in a variety of ways. For example, in electrostatic printing, the ink is driven from a nozzle toward a medium with an electrostatic field. Another ink jet printing procedure, known as squeeze tube, employs a piezo-electric element in the ink nozzle. Electrically-caused distortions of the piezo-electric element pump the ink through the nozzle and toward the print medium. In still another ink jet printing procedure, known as thermal or bubble ink jet printing, the ink is driven from a nozzle toward the print medium by the formation of an expanding vapor-phase bubble in the nozzle.

Ink compositions for use in ink jet printers generally comprise deionized water, a water-soluble or water-miscible organic solvent, and a colorant. Generally, the colorant is a soluble dye. Unfortunately, inks comprising soluble dyes can exhibit many problems, such as poor waterfastness, poor lightfastness, clogging of the jetting channels as a result of solvent evaporation and changes in the dye's solubility, dye crystallization, ink bleeding and feathering when prints are formed on plain papers, poor thermal stability, chemical instability, and ease of oxidation. Some of these problems can be minimized by replacing the dyes used in ink formulations with insoluble pigments. In general, pigments have superior properties with respect to dyes, such as good waterfastness, good lightfastness, good image density, thermal stability, oxidative stability, the ability to perform inter-color ink mixing, and compatibility with both coated/treated and plain papers.

In pigmented ink compositions, the pigment dispersion is generally stabilized by a polymeric component. For example, Ma et al., U.S. Pat. No. 5,085,698, disclose an ink composition comprising pigment, aqueous medium, and an acrylic/acrylate block copolymer as a stabilizing agent. Destabilization of the pigment dispersion can result in precipitation of pigment in the nozzle of the ink jet printer which can eventually adversely impact the printing process. Most prior art pigment dispersions will irreversibly clog the nozzle of ink jet printers when left standing in the atmosphere for an extended period of time (e.g., 6 hours).

U.S. Pat. No. 5,086,307 to Noguchi et al employs a graft polymer in an ink jet ink, but not one at all similar to the graft polymers of this invention. U.S. Pat. No. 5,302,197 to Wickramanayke et al employs hydroxyl-terminated branched polymer off a short carbon chain in an ink jet ink. U.S. Pat. No. 4,597,794 employs random copolymers of hydrophobic and hydrophilic segments in an ink jet ink. U.S. Pat. No. 5,254,425 to Suzuki et al employs a graft polymer in a liquid ink, but not one at all similar to the graft polymers of this invention.

While prior pigmented ink compositions for ink jet printers did show transient stability for the pigment dispersion, improved pigment ink dispersion is desired to meet the demanding needs of commercial ink jet printers.

It is therefore an object of the present invention to provide an improved pigmented ink composition for ink jet printers.

Other objects and advantages will become apparent from the following disclosure.

SUMMARY OF THE INVENTION

The present invention relates to an aqueous ink composition for use in ink jet printers comprising: (a) an aqueous carrier medium; (b) a pigment; and (c) a graft polymer component selected and comprising (i) a hydrophilic segment comprising a polymer or copolymer having an acidic functional group, and (ii) a graft hydrophobic segment joined to the acid polymer backbone by reaction of an acid function on the backbone of the polymer with a functional group on the hydrophobic segment. Many of the samples in this patent utilized the reaction of an amine with the acid to form an amide. More specifically, the polyacrylic acid backbone chain may be of weight average molecular weight between 1000 and 5000. Ideally, only one side chain molecule attaches to each backbone molecule.

A more thorough disclosure of the present invention is presented in the detailed description which follows.

DETAILED DESCRIPTION OF THE INVENTION

The present invention relates to an aqueous ink composition suitable for use in ink jet printers. The first component of the liquid ink composition is the graft polymer component. The graft polymer importantly functions to stabilize the pigment dispersion in the aqueous carrier medium. The graft polymer also assists in redispersion of the pigment after drying out of the nozzle during printer shutdown.

The graft polymer component comprises a carboxylic acid containing hydrophilic polymeric backbone to which is grafted a hydrophobic segment comprising a hydrophobic group, oligomer, or polymer. The hydrophobic group is joined to the carboxylic acid polymer backbone by the reaction of the carboxylic acid with a functional group on the hydrophobe. In this patent many of the examples were a condensation reaction of a hydrophobic amine with a carboxylic acid function on the back bone to form an amide. An alternate method which also is demonstrated in this patent is to use a poly amine back bone polymer and react a hydrophobic acid with the amine to form an amide graft on the polyamine. The remaining amines on the polymer back bone are converted to carboxylic acids by reaction of an anhydride, such as succinic anhydride, with the amine hydrogens. A variety of hydrophilic polymers or copolymers can be utilized as the backbone polymer component of the present invention. Suitable hydrophilic polymers include: polyacrylic acid, polymethacrylic acid or polyethyleneimine. Other suitable hydrophilic polymers will be known to those skilled in the art. The hydrophilic segment suitably has an acidic functional group such as a carboxyl substituent or amine in the backbone. Preferably, the hydrophilic segment is an acrylic or methacrylic polymer or copolymer thereof. In an alternative embodiment, the hydrophilic segment can comprise a polyamine polymer such as polyethyleneimine. The graft is positioned randomly at various sites along the backbone. This patent demonstrates four graft polymer structures that can be created by acid-amine condensation reactions to form amides which graft the hydrophobic segment to the polymer backbone. Other structures will be known to these skilled in the art. The four structures used as examples in this patent are:

1. Aliphatic or alkyl aryl amine condensed with polyacrylic acid, typically one (1) mole of amine to 50–60 moles of acrylic acid (weight average molecular weight of 3700 to 4500). Ideally, one amine molecule will attach to one acrylic acid polymer chain. This material can be represented by the following structures (having any essentially unreactive end groups):

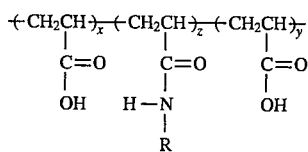

Where
x+y=20–200
z=1–10 (randomly dispersed)
and R=alkyl having 6–36 carbon atoms, or

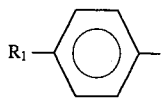

where $R_1$ is alkyl having 4–20 carbon atoms.

(2) Amine terminated acrylic ester condensed with poly acrylic acid. The structure represents approximately 40 moles of the ester monomer to 50–60 moles of the acid monomer. Ideally, one ester chain will attach to one acrylic acid chain. The ends groups may be any essentially unreactive end group.

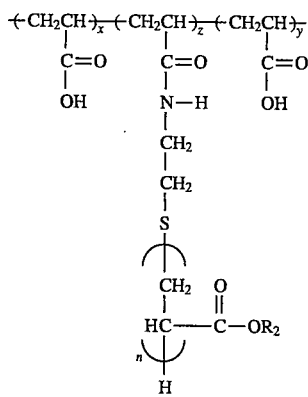

Where
x+y=20–200
z=1–10 (randomly dispersed)
n=2 to 40
$R_2$=alkyl or aryl, preferably butyl.

(3) Amine terminated polyoxyalkylene polymer condensed with polyacrylic acid. Ideally, one ether chain will attach to one acrylic acid chain. The amine terminated polyoxyalkylene polymer is such as those supplied by Texaco under the trademark Jeffamines. The end groups may be any essentially unreactive end group.

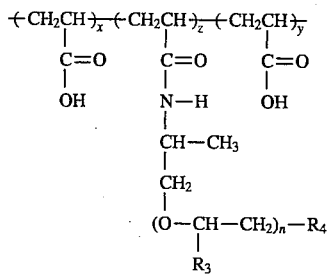

Where x+y=20–200 z=1–10 (randomly dispersed)

$R_3$=H, $CH_3$ preferrably $CH_3$ $R_4$=H, $CH_3$, $OCH_3$ n=10–60

(4) An alternate method to preparing similar structures is to start with an amine polymer as the back bone and condense a hydrophobic segment containing acid functional groups. Polyethyleneimine (PEI) weight average, molecular weight 300–600, condensed with an aliphatic acid (hydrophobic group) where the amount of acid condensed will react with a least one of the secondary amine nitrogens in the PEI. The remaining amine nitrogens are reacted with succinic anhydride to give the following structure.

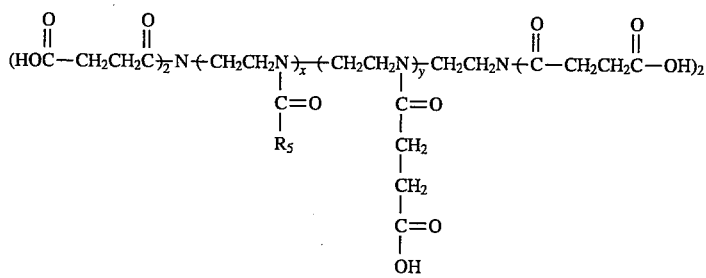

Where:

y=6–20 x=1–5

$R_5$=alkyl having 6–30 carbon atoms.

The graft polymer component suitably has a molecular weight Mn of about 800–5000. Suitably, the monomer ratio of the backbone to the hydrophobic segment polymer (imine hydrophilic monomer to aliphatic hydrophobic segment) is about 10–100 hydrophilic monomer to 1 hydrophobic segment, preferably about 40 to 1. The monomer to hydrophobic segment ratio provides the graft polymer component with its dispersibility property. The graft polymer component suitably comprises about 0.5 to about 10.0 weight % of the ink composition, preferably about 1 to 5 weight %.

The second component of the ink composition is the pigment, an insoluble colorant. A wide variety of organic and inorganic pigments can be utilized in the ink composition of the present invention. Suitable pigments include, for example, azo pigments such as azo lakes, insoluble azo pigments, condensed azo pigments, and chelate azo pigments; polycyclic pigments such as phthalocyanine pigments, anthraquinone pigments, quinacridone pigments, dioxazine pigments, thioindigo pigments, isoindolinone pigments, and quinophthalone pigments; dye lakes such as basic dye lakes, and acid dye lakes; organic pigments such as nitro pigments, nitroso pigments, aniline black, daylight fluorescent pigments; and inorganic pigments such as titanium oxide, iron oxides, and carbon black. Even pigments not described in the Color Index can all be used so long as they are dispersible in an aqueous medium.

The amount of the pigments may vary depending upon the structure, but they may commonly be used in an amount ranging from 1.0 to 10.0 weight %, and preferably from 2 to 6 weight % of ink composition.

The third component of the ink composition of the present invention is the aqueous carrier medium. The aqueous carrier medium comprises water and preferably a water-soluble organic solvent. A preferred water-soluble organic solvent is a polyhydric alcohol such as ethylene glycol, propylene glycol, butylene glycol, triethylene glycol, 1,2,6-hexanetriol, thiodiglycol, hexylene glycol, and diethylene glycol; diols such as butanediol, pentanediol, hexanediol, and homologous diols; glycol esters such as propylene glycol laurate; glycerol; polyalkyl glycols such as polyethylene glycol; and lower alkyl ethers of polyhydric alchohols, such as ethylene glycol monomethyl or monoethyl ether, diethylene glycol monoethyl ether or triethylene glycol monomethyl or monobutyl ether.

Other suitable water-soluble organic solvents include alcohols such as methanol, ethanol, propanol, and butanol; ketones such as acetone; ethers such as tetrahydrofuran and dioxane; esters such as ethyl acetate, sulfolanes, N-methyl pyrrolidone, lactones such as y-butyrolactone, lactams such as 2-pyrrolidone, 1-methyl-2-pyrrolidone, and 1-(2-hydroxyethyl)-2-pyrrolidone.

The ink composition is suitably prepared by mixing the components in a blender. Optionally, a surfactant may be added to enhance the pigment dispersion and modify the surface tension of the ink to control penetration of the ink into the paper. Suitable surfactants include nonionic, amphoteric and ionic. Other additives such as biocides, humectants, chelating agents, and viscosity modifiers may be added to the ink composition. It generally is desirable to make the pigmented ink jet ink in concentrated form to enhance pigment dispersion, which is subsequently diluted to the appropriate concentration for use in the ink jet printing system.

The following examples are detailed descriptions of the methods of preparation and the use of the ink compositions of the present invention. The detailed descriptions fall within the scope of, and serve to exemplify, the more general description set forth above. The examples are presented for illustrative purposes only, and are not intended as a restriction on the scope of the invention.

EXAMPLE 1

Preparation of polyacrylic acid-octadecylamine graft polymer.

In an evaporating dish weigh 2.8 g of octadecylamine, (MW=269.52 g, purity=98%, Aldrich Chemical Co.) and 27.7 g of polyacrylic acid, molecular weight 1800, from Polyscience Inc., cat #06513. The materials were physically mixed while melting at 110° C. The melt was placed in an oven at 110° C. After 10 minutes the melt was again mixed for several minutes. The temperature of the oven was raised to 175° C.

The melt was held at 175C. for 3.0 hours. The product was a brittle solid and spectroscopic analysis demonstrated the formation of the amide functional group.

EXAMPLE 2

Preparation of condensation product of polyacrylic acid (2000 MW) and Jeffamine

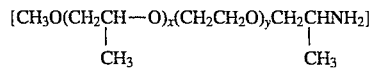

M–2070 (Texaco)

with x/y=10/32

30 g of Jeffamine -M-2070 is placed in a beaker and 100 g of N-methyl 2 pyrrolidone is added. Then 30 grams of 2000 molecular weight polyacrylic acid (Aldrich Chemical) is added. The beaker is heated until both reagents are dissolved. The solution is transferred to a flask with a distillation head for removal of water formed during the condensation. The flask was heated to 180° C. and the distillate greater than 100° C. was collected. Approximately 3 hours was required before water formation stopped. Temperature was lowered to 150° C. and the N-methyl-2 pyrrolidone was removed by vacuum distillation. Heating was stopped before all the N-methyl- 2-pyrrolidone was removed and approximately 60 ml of water was added and the acid groups neutralized with 4N potassium hydroxide.

EXAMPLE 3

Preparation of polyacrylic acid-Jeffamine M-600 condensation product.

In an evaporating dish 30 g of polyacrylic acid (Colloid 209 from Rhône-Poulenc, MW=4000) was added followed by 4.5grams of Jeffamine M-600 (Texaco)

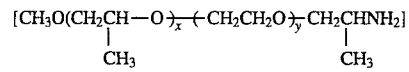

with x/y=9/1

The materials were physically mixed and then melted and stirred at 120° C. The melt was placed in an oven at 120° C. and the temperature increased to 175° C. The melt was held at this temperature for 3 hours. The product was cooled and dissolved in water using potassium hydroxide for neutralization.

EXAMPLE 4

Preparation of polyacrylic Acid (4000MW) and octadecyl amine graft polymer.

In an evaporating dish weigh 24 gram (0.003 moles) of Colloid 209 (50% solids) [4000 molecular weight polyacrylic acid from Rhône-Poulenc]. Add 0.88 gram of octadecylamine (0.003 moles) from Aldrich Chemical, 92% purity. Heat the evaporating dish to melt the two materials and thoroughly mix by mechanical stirring. The melt is placed in an oven at 175° C. and heated for a minimum of three hours. The product is a brittle solid. The material was dissolved in water using potassium hydroxide as the neutralizing agent.

EXAMPLE 5

Preparation of Polyethyleneimine (MW=600) —Stearic/Palmitic Acid—Succinic anhydride reaction product graft polymer.

30 g of Polyethyleneimine, MW=600 (PEI-600) was weighed into a glass beaker (100 ml). 13.1 g of Stearic/Palmitic Acid mixture, (Mallinkrodt NF 48.4% stearic;51.6% Palmitic) was added and stirred on a hot plate. The mixture was heated to 170°C. for 3 hours. Evolution of water was observed for first two hours. Melt was allowed to cool to 100° C. and poured into 200 ml of cold DI water with stirring. Additional water was added with complete dissolution of the melt in 350 ml of water. Succinic anhydride (67.1 g) was added gradually as solid with stirring. Initial pH was 10 but dropped and was maintained at 6–8 with 4N NaOH solution. Temperature was maintained at 35° C. during the addition of succinic anhydride. The product was a clear solution, 678 g, pH=6.5 which was evaluated and found to be an effective pigment dispersant for use in ink jet inks.

EXAMPLE 6

Preparation of polyacrylic acid- amine terminated poly-N-butyl acrylate graft polymer.

Weigh 12 g (0.0025 moles) of polyacrylic acid (MW-4800) into a flask. Add 100ml of dioxane. Add 0.4 ml (0.005 moles) of thionyl chloride and heat for 3 hours under reflux. Add 5 g (0.0025 moles) of amine terminated poly N-butyl acrylate (MW=2000) prepared as described in the patent application titled: "Preparation of Amino Terminated Polyacrylates" by Bradley L. Beach et al, filed the same day as this application was filed and assigned to the same assignee as this application is assigned. Add an equal molar concentration of pyridine. Reflux for 2 hours. Add hexane to precipitate polymer and dry.

PREPARATION OF INKS

Preparation of Ink Composition Concentrate

Into a 125 ml bottle, weight the following ingredients:

| | |
|---|---|
| DI WATER | 39.80 g |
| GRAFT POLYMER DISPERSANT | 5.0 g |
| DEFOAMER | 0.20 g |

Place in a blender at low speed with the bottle in an ice bath to reduce the amount of heat generated. Slowly add 5 g of Special Black 4A Carbon Black available from DeGussa. After addition is complete, let mix for 15 minutes. Add about 400 g of steel shot. Place on paint shaker 30 minutes. Remove for 30 minutes or until the temperature returns to about room temperature. Place on paint shaker 30 additional minutes. Remove for 30 minutes or until the temperature returns to about room temperature. Place on paint shaker 15 more minutes. Remove. Do not prepare ink until the pre-mix has returned to room temperature.

PREPARATION OF FINAL INK

1) Weigh 17.5 g of the concentrate into a 125 ml bottle. Stir with a magnetic stirrer.

2) Into a 100ml beaker, weigh the following ingredients:

| | |
|---|---|
| DI WATER | 27.10 g |
| DIETHYLENE GLYCOL | 5.00 g |
| PROXEL GXL biocide | 0.10 g |
| SODIUM PHOSPHATE DIBASIC HEPTAHYDRATE (buffer) | 0.15 g |
| SODIUM TETRABORATE DECAHYDRATE (buffer) | 0.15 g |

3) Mix using a magnetic stirrer about 10 minutes.

4) Pour mixture from step #2 into a dropping funnel. Allow the solution to slowly drip into the bottle of Pre-Mix from step #1 with continued stirring.

5) Check the pH. Adjust to 8.5.

6) Filter using a pre-filter and 0.7 μGF/F filter.

PRINT TESTING OF INKS

The inks were print tested using an IBM Model IJ4076 printer manufactured by Lexmark. The print samples were generated on IBM Multisystem Bond paper and gave the following results:

| | |
|---|---|
| Optical density | 1.0–1.3 as measured by Macbeth densitometer |

Edge sharpness and resolution excellent.

MAINTENANCE TESTING

Capping stations of a Lexmark 4076 printhead were disabled to leave the printhead uncapped when the printer was not printing. The printer was left in standby mode for 6 hours at ambient conditions. The printer was then activated and run for 6750 heater fires on each of the 50 nozzles of the printhead. The recovery of the nozzles is reported as (# of nozzles recovered/50) @time hours).

SYNTHESIZED MATERIAL EVALUATED

The following shows full recovery of all nozzles for three of the foregoing examples of this invention and recovery of 40 of 50 nozzles for the others. A range of previously known dispersants including block and random polymers showed no recovery of any of the 50 nozzles in comparable tests.

| DISPERSANT STRUCTURE | UNCAPPED MAINTENANCE | COMMENTS |
|---|---|---|
| Example 1 | 50/50 @ 6 HRS | |
| Example 2 | 40/50 @ 6 HRS | |
| Example 3 | 50/50 @ 6 HRS | SLIGHT OPTICAL |

| DISPERSANT STRUCTURE | UNCAPPED MAINTENANCE | COMMENTS |
|---|---|---|
| Example 5 | 50/50 @ 6 HRS | DENSITY LOSS OVER TIME SOME INKS SETTLED OVER TIME |

Although this invention has been described with respect to specific embodiments, the details thereof are not to be constructed as limitations for it will be apparent that various embodiments, changes, and modifications may be resorted to without departing from the spirit and scope thereof, and it is understood that such equivalent embodiments are intended to be included within the scope of this invention.

What is claimed is:

1. An aqueous ink composition for ink jet printers comprising an aqueous carrier, a pigment, and a polymer component selected from a graft polymer comprising:

(a) a hydrophilic polyacrylic acid backbone of weight average molecular weight between 1000 and 5000; and (b) hydrophobic segment side chains, in amount of one to ten side chains attached to one backbone chain.

2. The aqueous ink as in claim 1 in which said graft polymer comprises

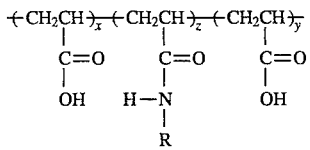

Where $x+y=20-200$ $z=1-10$ (randomly dispersed)

and

R=alkyl having 6–36 carbon atoms, or

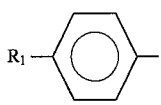

where $R_1$ is alkyl having 4–20 carbon atoms.

3. The aqueous ink as in claim 1 in which said graft polymer comprises

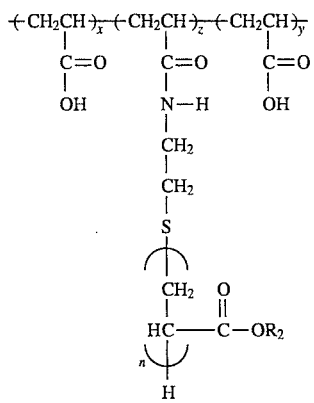

Where $x+y=20-200$ $z=1-10$ (randomly dispersed)

$n=2$ to 40

$R_2$=alkyl or aryl.

4. The aqueous ink as in claim 1 in which said graft polymer comprises

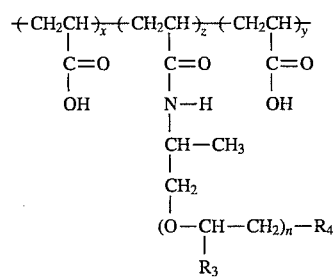

Where $x+y=20-200$ $z=1-10$ (randomly dispersed)

$R_3$=H, $CH_3$ $R_4$=H, $CH_3$, $OCH_3$ $n=10-60$.

5. An aqueous ink composition for ink jet printers comprising an aqueous carrier, a pigment, and copolymer component selected from a graft polymer as follows:

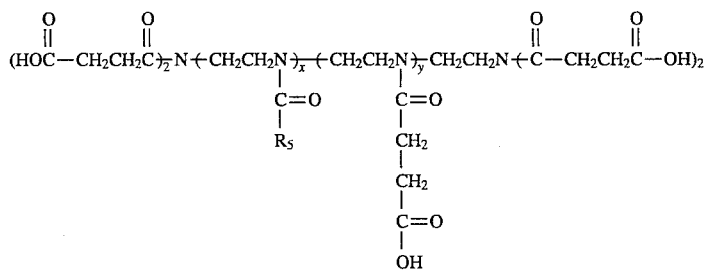

Where:

y=6–20 x=1–5

$R_5$=alkyl having 6–30 carbon atoms.

6. An aqueous ink composition for ink jet printer comprising an aqueous carrier, a pigment, and a polymer component comprising (a) a hydrophilic polymeric segment: and (b) a hydrophobic segment having a hydrolytically stable substituent connected to said hydrophilic segment by the following linkage:

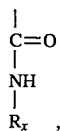

wherein $R_x$ is the remainder of said hydrophobic segment and the C is bonded to said hydrophilic segment, and where in $R_x$ is selected from the group consisting of alkyl having 6–36 atoms;

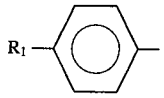

where $R_1$ is alkyl having 4–20 carbon atoms;

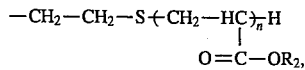

where n=2 to 40 and $R_2$ =alkyl or aryl; and

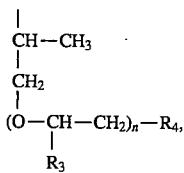

where $R_3$-H, $CH_3$ and $R_4$=H, $CH_3$, $OCH_3$ and n=10–60.

7. The aqueous ink of claim 6 in which said $R_x$ is alkyl having 6–36 atoms or

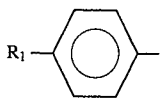

where $R_1$ is alkyl having 4–20 carbon atoms.

8. The aqueous ink of claim 6 in which said $R_x$ is

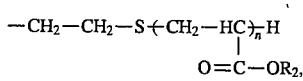

n=2 to 40 where $R_2$=alkyl or aryl.

9. The aqueous ink of claim 6 in which said $R_x$ is

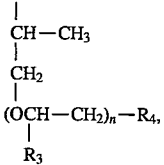

where $R_3$=H, $CH_3$ and $R_4$=H, $CH_3$,

n=10–60.

10. The aqueous ink of claim 9 wherein said polymer component is a graft polymer.

11. The aqueous ink of claim 6 wherein said polymer component is a graft polymer.

12. The aqueous ink of claim 7 wherein said polymer component is a graft polymer.

13. The aqueous ink of claim 8 wherein said polymer component is a graft polymer.

* * * * *